March 24, 1936.  F. G. ALBORN  2,035,212
MOTOR VEHICLE
Filed Nov. 10, 1934  10 Sheets-Sheet 1

Fig. 1.

INVENTOR
Frank G. Alborn.
BY
RM Cooper
ATTORNEY.

Fig. 2.

March 24, 1936.　　F. G. ALBORN　　2,035,212
MOTOR VEHICLE
Filed Nov. 10, 1934　　10 Sheets-Sheet 4

Fig. 6.

INVENTOR.
Frank G. Alborn.

RMCooper
ATTORNEY.

March 24, 1936.  F. G. ALBORN  2,035,212
MOTOR VEHICLE
Filed Nov. 10, 1934  10 Sheets-Sheet 7

INVENTOR
Frank G. Alborn.
BY
R M Cooper
ATTORNEY

March 24, 1936.　　F. G. ALBORN　　2,035,212
MOTOR VEHICLE
Filed Nov. 10, 1934　　10 Sheets-Sheet 8

INVENTOR.
Frank G. Alborn.
BY
R M Cooper
ATTORNEY.

March 24, 1936.  F. G. ALBORN  2,035,212
MOTOR VEHICLE
Filed Nov. 10, 1934  10 Sheets-Sheet 9

INVENTOR.
Frank G. Alborn.
BY
R M Cooper
ATTORNEY.

INVENTOR.
Frank G. Alborn

Patented Mar. 24, 1936

2,035,212

UNITED STATES PATENT OFFICE 2,035,212

MOTOR VEHICLE

Frank G. Alborn, Cleveland, Ohio, assignor to The White Motor Company, Cleveland, Ohio, a corporation of Ohio Application November 10, 1934, Serial No. 752,496

12 Claims. (Cl. 180—54)

My invention relates to motor vehicles, and is particularly concerned with the provision of a construction for increasing the load carrying capacity of vehicles of the type set forth.

For a number of years, engineers have tried with varying degrees of success to design and construct an efficient motor truck affording a greater length of chassis for load carrying purposes than the conventional type of truck in which the engine is mounted beneath a hood in front of the cab or driver's seat.

In one type of construction employed to provide a greater length of chassis for load carrying purposes, the engine is mounted crosswise of the vehicle in a position beneath the driver's seat. This type of construction restricts the size of the engine, and complicates the power transmission mechanism by requiring an abrupt turn in the drive line.

In another type of construction which employs an engine constructed with vertical cylinders, the engine is mounted adjacent the driver's seat in a position to protrude through the floor of the driver's compartment, the protrusion of the engine through the floor being necessary to attain a practical floor height without decreasing the road clearance beyond an allowable limit. The projection of the engine into the driver's compartment in this type of vehicle detracts from the comfort of the driver, renders it difficult for the driver to reach his seat from one side of the vehicle, and crowds and complicates the control mechanism of the vehicle.

My invention provides a construction which is free of the objectionable features set forth in connection with the above described types of construction. In accordance with my invention, the engine is mounted under the floor of the driver's compartment, and is so constructed and coordinated with the other parts of the vehicle that a practical floor height in the driver's compartment is obtained without decreasing the road clearance beyond allowable limits.

An important feature of my invention resides in the use of an engine of the horizontal type, the structure of which is specifically limited in its vertical dimension.

A second important feature of my invention resides in dropping the forward portion of the chassis frame to provide a lower mounting for the engine.

A third important feature of my invention resides in forming the forward axle with a dropped central portion to provide clearance for the engine.

A fourth important feature of my invention resides in mounting the springs of the vehicle at the sides of the chassis frame in a manner to obtain a lower mounting of the chassis frame.

A fifth important feature of my invention resides in mounting the engine and change speed mechanism for ready removal from the vehicle.

A further important feature of the invention resides in providing easy accessibility to the important parts of the engine when the engine is in place in the vehicle.

In addition to providing an improved truck construction of the character set forth, my invention has for its object the provision of a vehicle construction which can be employed in any vehicle requiring either large load or passenger carrying facilities.

The truck illustrated in the drawings comprises generally a cab A, a chassis frame B, front and rear axles C and D, front and rear wheels E and F, and a power plant G embodying an engine *b* and a transmission *c*.

The chassis frame B (see Figures 1, 2, 3, 6 and 9) comprises two side rails 10 connected by a plurality of advantageously placed cross members including two U-shaped members 11 and 12 and two tubular members 13 and 14 extending directly between the side rails, and a tubular member 15 extending between the depending ends of two brackets 16 secured to the sides of the side rails. Such frame is formed with a dropped portion at its forward end in order to provide a low mounting for the power plant, and with the object of reducing the height of such part and to attain a lower disposition of the power plant is mounted upon the axles C and D by means of springs mounted at the sides of the side rails.

The forward end of the chassis frame is supported from the front axle C by two springs 17, and the rear end thereof from the rear axle D by two springs 18, the springs 17 and 18 being secured to the axles C and D in a conventional manner by means of U-bolts 19. The front springs 17 are pivotally connected at their forward ends through rigidly attached blocks 20 (Figures 9 and 14) to the brackets 16, and at their rear ends through pivotally associated shackle members 21 to brackets 22 secured to the side rails of the chassis frame. The rear springs 18, which include helper springs 23 bearing against plates 24 secured to the sides of the side rails 10, are connected by pivotally associated shackle members 25 to forwardly and rearwardly disposed brackets 26 and 27 secured to the sides of the side rails of the chassis frame. Radius rods 28 connected at their rear end to the axle D and at their forward ends to a bracket 29 secured to the side rails 10 maintain the rear axle in proper relation to the frame.

The rear axle D is of a conventional double reduction type and embodies a differential mounted in the central portion of the axle housing, drive shafts leading from the differential to the rear wheels, and reduction gearing connecting the differential with a drive shaft 30 leading from the transmission *c*.

The front axle C (see Figures 2, 6 and 9) is constructed in a more or less conventional manner and comprises a downwardly curved member 31 and steering knuckles 32 journalled on the ends of the member 31. The steering knuckles are formed with spindles 33 upon which are journalled the front wheels E and with arms 34 connected by a tie rod 35. The left hand steering knuckle 32 is constructed with a steering arm 36 which is connected through a drag link 37 with the operating lever 38 of a steering gear assembly *d* removably mounted at the forward end of the chassis frame.

The steering gear assembly *d* (see Figures 1, 2 and 9) supports a portion of the control mechanism for the vehicle including a brake pedal 39 and a clutch operating pedal 40, and is mounted in place upon a bracket 41 secured to the left hand side rail of the chassis frame. It is supported upon the bracket 41 by means of a tubular projection 42 on a casing 43 at the lower end of the assembly, and is secured in position by a cap 44 secured to the upper end of the bracket 41 by studs 45 and to the casing 43 by a stud 46.

To prepare the steering gear assembly for removal, the arm 38 is disconnected from the tie rod 37, the control mechanism carried by the assembly disconnected from associated parts, and the nuts on the ends of the studs 45 unscrewed and removed. The steering gear assembly can then be removed by simply lifting it upward out of position.

The power plant G (see Figures 3, 6, 9, 12 and 14) is removably mounted upon the forward dropped portion of the chassis frame B through the instrumentality of a frame *e* of rectangular form. The frame *e* comprises four tubular members 47, 48, 49 and 50 joined together in the form of a rectangle by means of T-joints 51. Formed on the rear T-joints 51, there are two pads 52 which support the rear portion of the power plant, and welded to the forward cross member 47 there are two pads 53 which support the forward end of the power plant. The power plant is supported from the frame e by the two legs 54 formed on the forward end of the engine and two legs 55 formed on the bell housing of the engine, the legs 54 registering with the pads 53 and the legs 55 with the pads 52. The legs 54 and 55 rest on rubber members 56, reinforced with metal shells 57, inserted between such parts and the pads 52 and 53, and are secured to the pads by bolts 58 which extend through the members 56.

Figure 1:
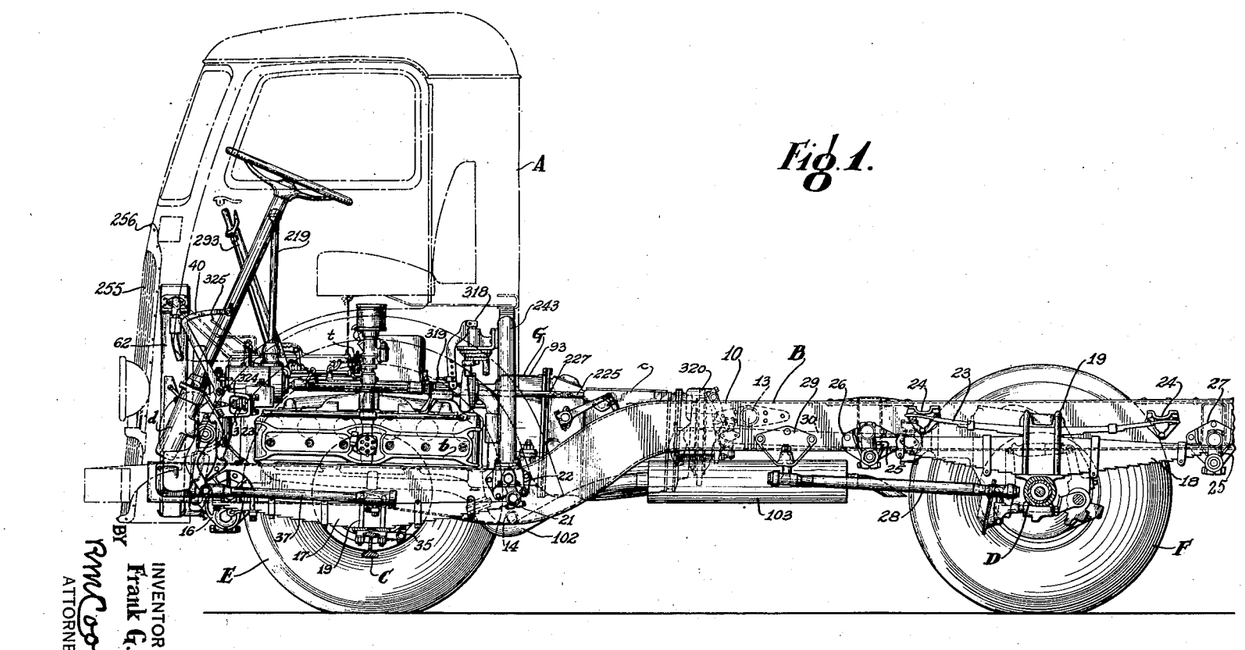
Figure 1 is a side elevation of the chassis of a motor truck embodying the present invention, the cab of the truck being shown in dot and dash lines, and the near wheels and a portion of the axles of the chassis being removed.
Figure 2:
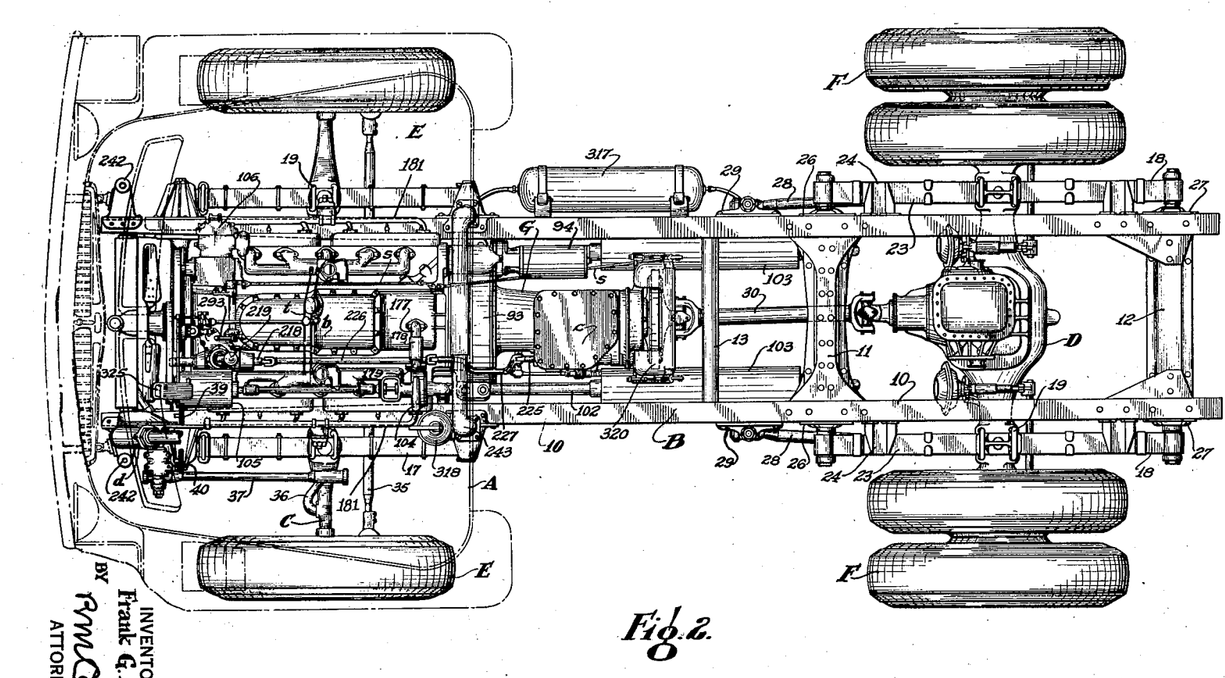
Figure 2 is a plan view of the chassis illustrated in Figure 1, the cab of the truck again being shown in dot and dash lines.
Figures 3, 4, 5:
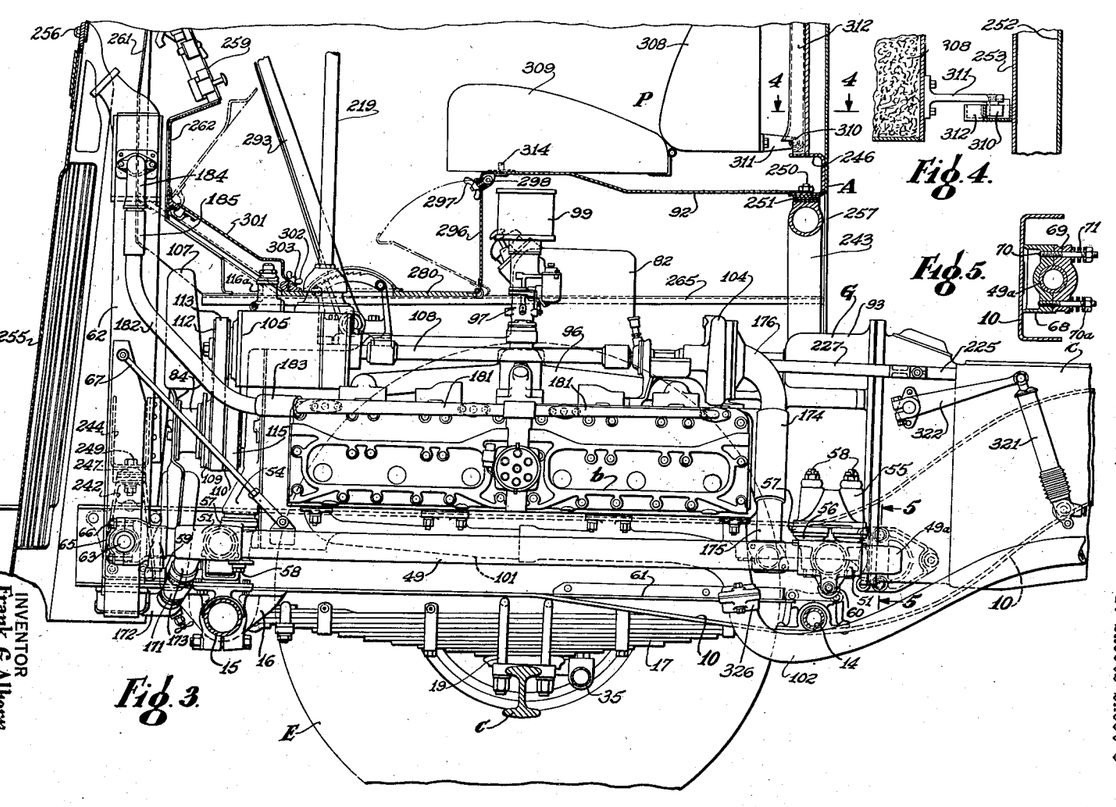
Figure 3 is a fragmentary elevational view of the forward end of the truck in which the cab is shown in section, and in which the near side rail, the near wheel, and a portion of the axle are removed.
Figure 4 is a fragmentary sectional view of the cab taken on line 4—4 of Figure 3.
Figure 5 is a sectional view of the chassis taken on line 5—5 of Figure 3.
Figure 6:
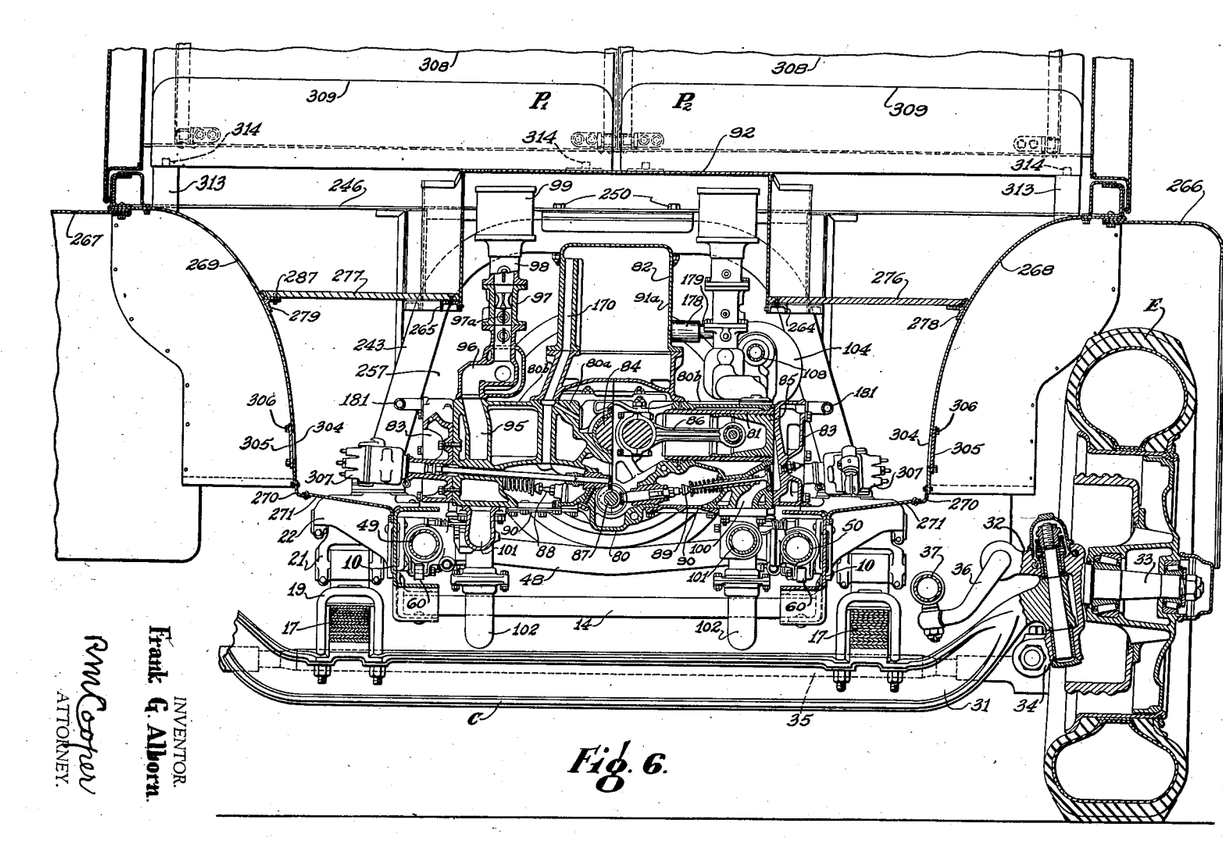
Figure 6 is a fragmentary vertical section of the truck taken through the center of the engine, the section of the engine being composite, and consisting of a portion at one side taken through the cylinder of the engine and a portion at the other side being taken intermediate two of the cylinders of the engine.
Figures 7, 8, 9, 10, 11:
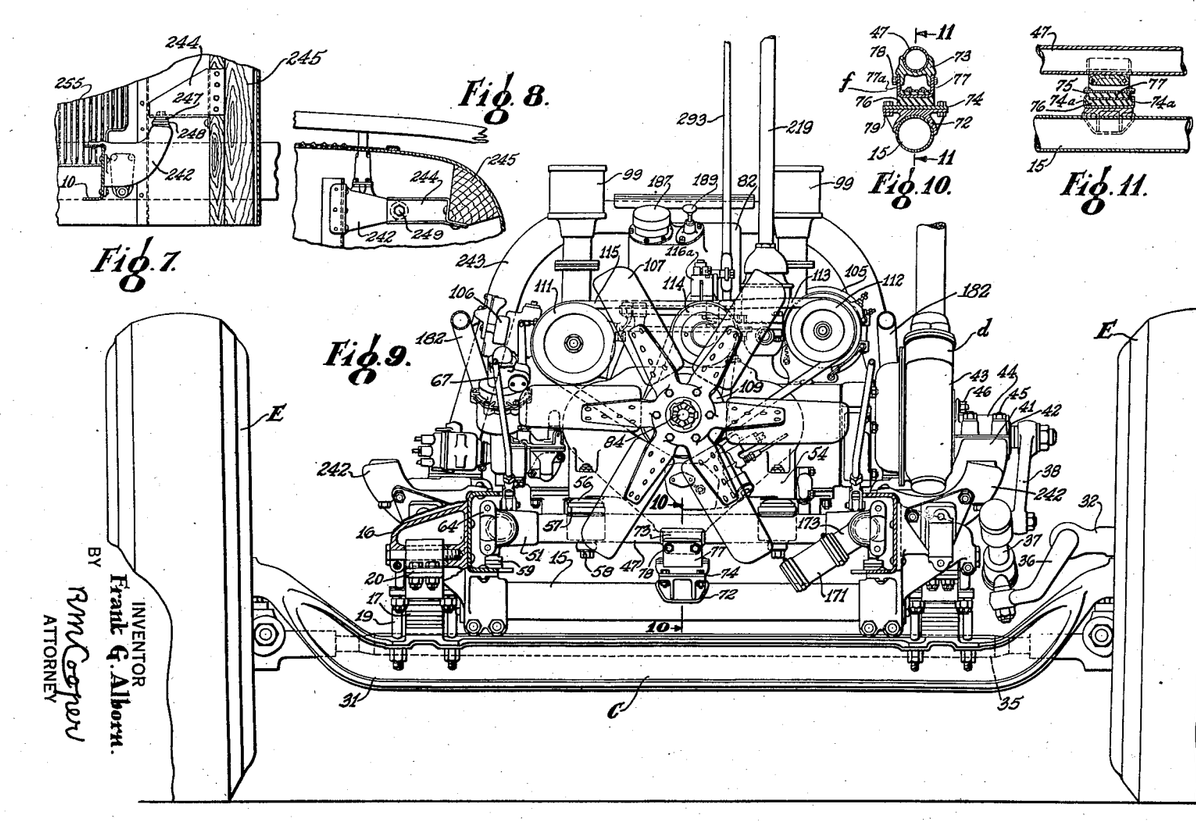
Figure 7 is a fragmentary vertical section of the truck taken at the forward right hand lower corner of the cab.
Figure 8 is a fragmentary horizontal section of the truck taken at the front lower right hand corner of the cab.
Figure 9 is a fragmentary front elevational view of the chassis of the truck with the radiator removed, and the forward portions of the side rails of the chassis frame cut away.
Figure 10 is a fragmentary sectional view taken on line 10—10 of Figure 9.
Figure 11 is a sectional view taken on line 11—11 of Figure 10.
Figures 12, 13, 14:
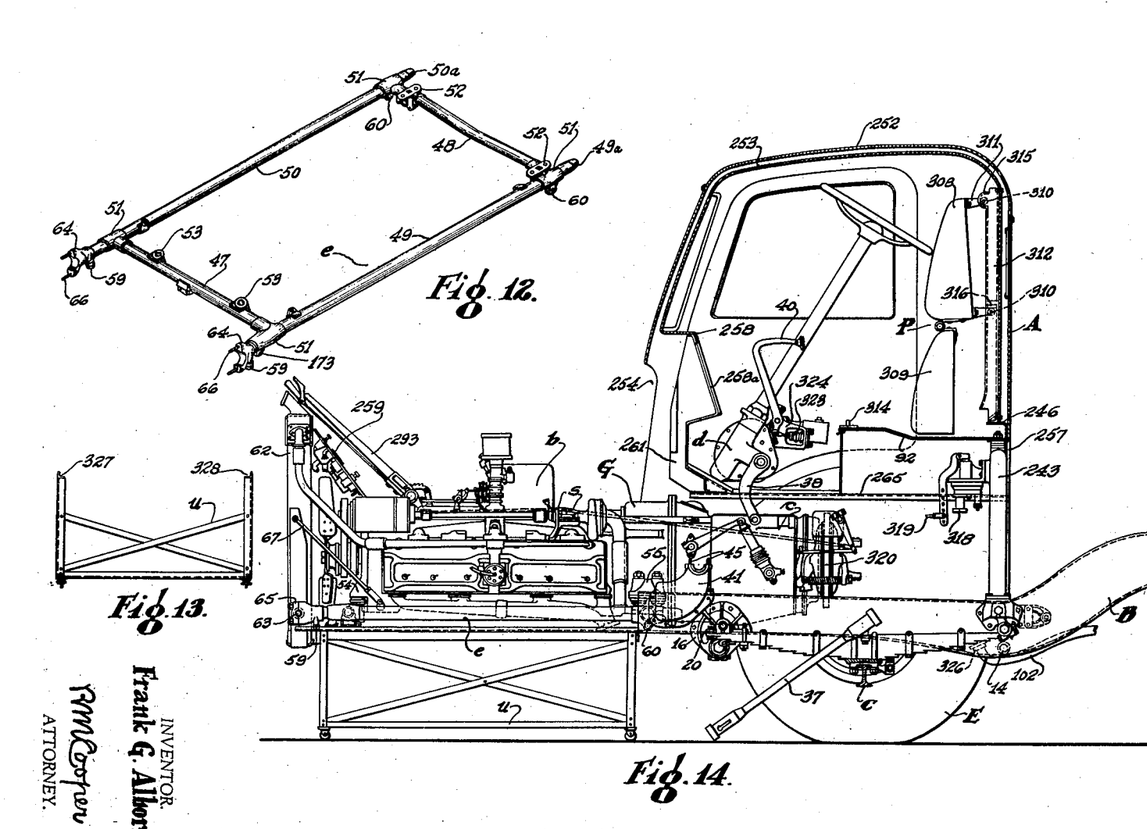
Figure 12 is a perspective view of a sub-frame which supports the power plant of the truck, with the caps at the ends of the side members of the frame removed.
Figure 13 is an end view of a dolly used in the removal of the power plant from the truck.
Figure 14 is a view illustrating the manner in which the power plant is removed from the vehicle, the cab being shown in section and the near wheel and a portion of the axle being removed.

Mounted in the forward T-connections 51, there are two downwardly extending rubber members 59 designed to engage the lower flanges of the side rails 10; and mounted between lugs formed on the rear T-connection 51, there are two rollers 60 designed to engage the lower flanges of the side rails 10 and the flanges of a pair of members 61 secured to the side rails to facilitate removal of the engine, but which when the power plant is secured in place occupy positions out of engagement with the flanges of the members 61.

In addition to the power plant G, the frame e supports a water cooling radiator 62 for the engine. The radiator 62 is constructed with two transversely extending pins 63 which are clamped between parts 64 welded on the ends of the members 49 and 50 and two caps 65 secured in place by stud-bolts 66. Two rods 67 connected at their upper ends to the side of the radiator and at their lower ends to the members 49 and 50 maintain the radiator in an upright position with respect to the frame.

The side members 49 and 50 of the frame e extend beyond the rear T-joint 51, the extensions 49a and 50a being employed to support the rear end of the frame e from the side rails 10 of the chassis frame. When the frame e is in position within the vehicle, the extensions 49a and 50a are clamped between members 68 secured to the side rails and caps 69 secured in place by stud-bolts 70, springs 71 being inserted between caps 69 and nuts 70a of the bolts 70 to permit limited relative movement of the members 49 and 50 with respect to the side rails 10. The terminating ends of the extensions 49a and 50a are bevelled in such a manner that they co-act with the parts 68 and 69 to lift the rollers 60 from the flanges of the members 61 when the frame is inserted in the vehicle as hereinafter explained. The forward end of the frame e is supported from the cross member 15 through a mechanism f secured at its bottom end to a pad 72 welded on the cross member 15, and at its top end to a member 73 welded on the member 47.

The mechanism f comprises a plate 74 formed with upwardly extending arms 74a, a plate 75 extending between and connected to the upper ends of the arms 74a, a rubber member 76 mounted between the arms 74a and vulcanized to the contiguous surfaces of the members surrounding it, and a U-shaped member 77 disposed at right angles to the U formed by the legs 74a and having its lower portion embedded within the rubber member 76. The legs 77a of the part 77 straddle a projection on the member 73 and are secured thereto by bolts 78. The plate 74 is secured to the member 72 on the cross member 15 by means of bolts 79.

The engine b is constructed with horizontally disposed cylinders and in such a manner as to have a relatively small depth or vertical projection as compared with an engine constructed with vertical cylinders. To further minimize its depth the engine is provided with a lubricating system of the dry-sump type employing a shallow oil receiving reservoir maintained substantially empty of oil during operation of the engine. For the purpose of definition, it may be termed a dry-sump engine.

Generally described, (see Figures 2, 6, 15 and 16) the engine b comprises a casting 80 formed with a crankcase portion 80a and cylinder supporting portions 80b, cylinder sleeves 81, a crankcase cover 82, cylinder heads 83, a crankshaft 84, pistons 85, connecting rods 86, a camshaft 87, and inlet and exhaust valves 88 and 89. The organization of the engine is such that the valves 88 and 89 are located in the underside of the engine in a position to be readily accessible through the removal of the cover plates 90. The crankcase cover 82 is constructed with a supply reservoir 91 comprising an upwardly projecting portion 91a which extends above the floor of the cab and is located within a rectangular housing 92 beneath the seat in the cab. Included within the engine assembly is a conventional type clutch mounted in a casing 93 at the rear of the engine, and mounted upon the wall of the casing of the transmission c which adjoins the casing 93 there is an electrical motor 94 for starting the engine.

Figure 15:
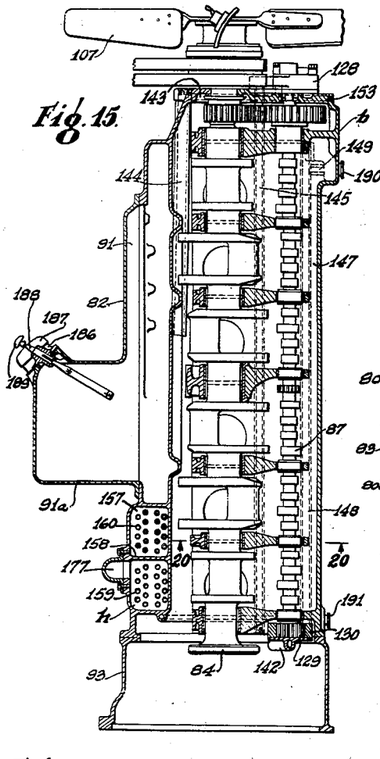
Figure 15 is a longitudinal section of the engine taken through the center of the engine.
Figure 16:
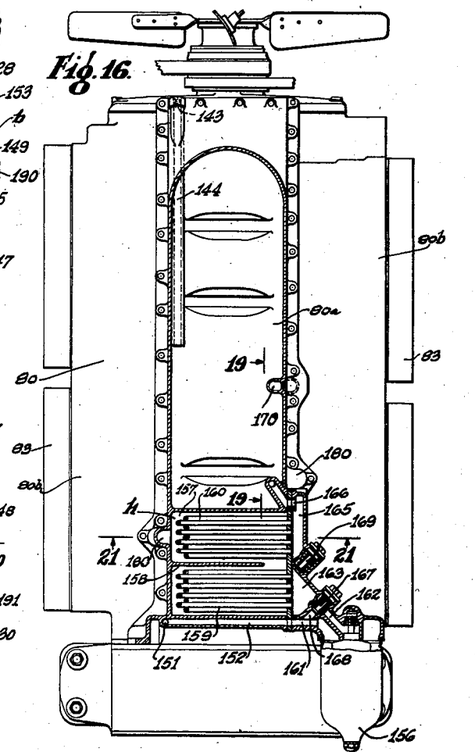
Figure 16 is a plan view of the engine, certain parts being broken away in order to show internal construction.

The cylinders at the different sides of the engine are provided with separate fuel induction systems of the down-draft type. The system for each set of cylinders comprising canals 95 formed in the casting 80, a manifold 96 mounted on the upper side of the casting 80, a carburetor 97 mounted on an extension of the manifold, a breather pipe 98 extending upward from the carburetor, and an air cleaner 99 attached to the end of the breather pipe. The carburetors 97 and air cleaners 99 extend above the floor of the cab and are located in the housing 92 at the sides of the upwardly protruding portion 91a of the reservoir 91.

The cylinders at the different sides of the engine are also provided with separate exhaust systems, the system for each set of cylinders comprising conduits 100 formed in the lower portion of the casting 80, an exhaust manifold 101 mounted on the lower side of the casting 80, an exhaust pipe 102 leading toward the rear of the bus, and a muffler 103 attached to the end of the exhaust pipe.

The engine is constructed with a water pump 104 mounted at the rear end thereof, and supports an electrical generator 105 and an air compressor 106 at its forward end. (See Figures 3, 9, 22 and 23). The engine also supports a fan 107 for cooling the radiator 62 mounted on the engine crankshaft 85. The drive shaft of the pump 104 is connected with the armature shaft of the generator 105 by a drive shaft 108; and the air compressor 106, generator 105 and water pump 104 are all driven from the crankshaft 84 by means of belts. As illustrated, the hub of the fan 107 is constructed with two pulleys 109 and 110, and the forward end of the drive shafts of the compressor 106 and the generator 105 equipped with pulleys 111 and 112. A belt 113 extending around the pulley 112, the pulley 109, and the forward section of a compound idler pulley 114 mounted on the forward end of the engine forms a driving connection between the crankshaft 84 and the armature shaft of the generator 105. A second belt 115 extending around the pulley 111, the pulley 110, and the rear section of the idler pulley 114 forms a driving connection between the crankshaft 84 and the drive shaft of the compressor 106.

Figure 22:
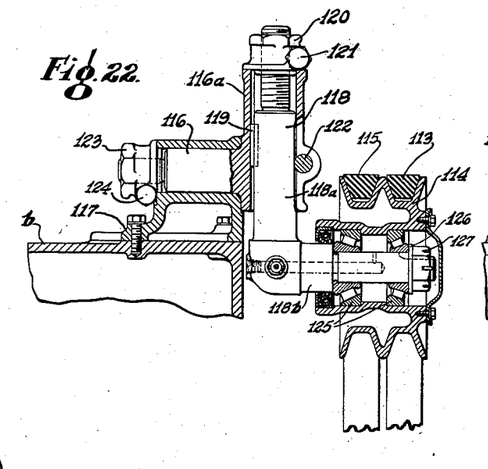
Figure 22 is a fragmentary sectional view of the forward end of the engine illustrating the mounting of the idler pulley employed in conjunction with the driving belts.
Figure 23:
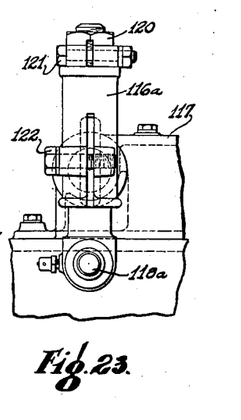
Figure 23 is a front view of the mechanism shown in Figure 22, the idler pulley and belts being omitted.

The idler pulley 114 is adjustably mounted in position, and is employed to adjust the tension of the belts 113 and 115. The mounting for such pulley comprises a member 116 pivotally mounted in a bracket 117 on the upper part of the engine and formed at its forward end with a sleeve 116a, and an angulated member 118 comprising a vertical arm 118a adjustably mounted in the sleeve 116a at the forward end of the member 116 and a horizontal arm 118b which supports the pulley 114. The member 118 is held against rotation with respect to the member 116 by means of a key 119 mounted in the arm 118a and extending in a groove in the sleeve 116a, and is secured in position by means of a split nut 120 equipped with a clamping bolt 121 screwed onto its upper threaded end and by a bolt 122 connecting the lower split portions of the sleeve 116a. The member 116 is retained in the bracket 117 by means of a split nut 123 equipped with a clamp bolt 124. The pulley 114 is supported on the arm 118b by anti-friction bearings 125, and is retained in place by a washer 126 and nut 127 mounted on the threaded outer end of such member.

To adjust the tension of the belts 113 and 115 the clamping bolts 121 and 122 are loosened, the nut 120 turned to raise or lower the member 118, and the clamping bolts tightened. Equal tension of the belts 113 and 115 results from the member 116 being pivotally mounted within the bracket 117.

The lubricating system for the engine b (see Figures 15 to 21) comprises two gear pumps 128 and 129 operatively connected to opposite ends of the camshaft 87. The gear pump 128 at the forward end of the camshaft is of a conventional two-gear type constructed with a single outlet and a single inlet. The gear pump 129 at the rear end of the camshaft is of a less conventional type and is constructed with two inlets and a single outlet.

Figures 17, 18, 19, 20, 21:
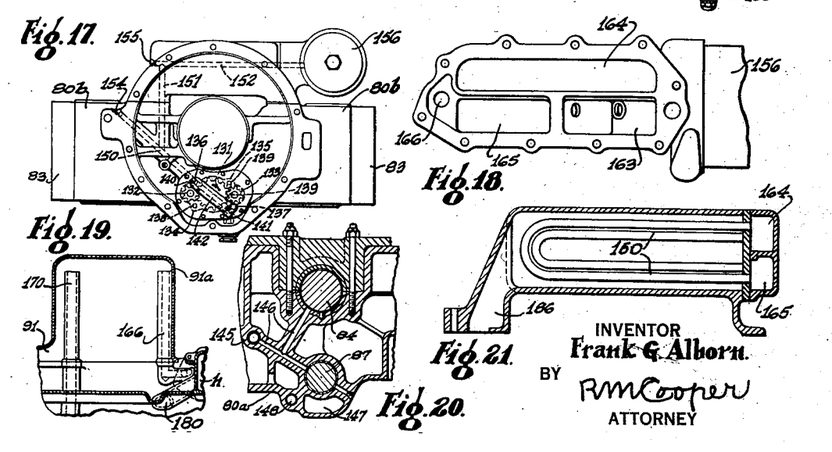
Figure 17 is a rear elevational view of the engine with the bell housing removed.
Figure 18 is a detail view of a casting employed in the construction of the rear end of the engine, together with a fragmentary side view of an oil cleaner supported thereon, the section being taken so as to show the interior construction of the casting.
Figure 19 is a fragmentary sectional view of the upper part of the engine taken on a line corresponding with line 19—19 of Figure 16.
Figure 20 is a fragmentary sectional view of the engine taken on a line corresponding with line 20—20 of Figure 15.
Figure 21 is a sectional view taken through the upper part of the engine on a line corresponding with line 21—21 of Figure 16.

Generally described, the pump 129 comprises a casing 130, a large gear 131 directly connected to the camshaft and two small idler gears 132 and 133 located at opposite sides of the large gear 131. The casing 130 is recessed away from the gears at four points forming two inlet chambers 134 and 135 and two outlet chambers 136 and 137. The inlet chambers 134 and 135 communicate with separate inlet ducts respectively indicated by the numbers 138 and 139, and the pressure chambers 136 and 137 with separate ducts 140 and 141 leading into a common outlet duct 142.

In operation of the engine, the gear 131 is rotated by the camshaft in the direction of the arrow in Figure 17 of the drawings with the result that oil is drawn into the chambers 134 and 135, and delivered therefrom into the pressure chambers 136 and 137, from where it is forced out through the ducts 140 and 141 into the duct 142.

The pump 128 at the forward end of the camshaft communicates at its intake side through two serially connected conduits 143 and 144 with the supply reservoir 91 in the crankcase cover 82, and at its discharge side is connected with a manifold 145 which communicates with ducts 146 leading to the various bearings of the engine. The inlet chamber 135 of the pump 129 communicates through the duct 139 with the rear end of a reservoir 147 formed in the bottom of the casting 80, and the inlet chamber 134 through the duct 138 and conduits 148 and 149 with the forward end of the reservoir 147. The pressure chambers 136 and 137 of the pump 129 communicate through the ducts 140 and 141, and the duct 142, with an upwardly extending duct 150. The duct 150 communicates through a duct 151 with a transverse duct 152 leading into an oil cleaning and cooling system h located at the rear end of the cover 82. The ducts 143, 150 and 152, which extend to the outer surface of the engine, are closed at their outer ends by screw plugs 153, 154 and 155 respectively.

Generally described, the oil cleaning and cooling system h comprises a filter 156, a water chamber 157 divided into two compartments by a baffle 158, two sets of cooling tubes 159 and 160, and an arrangement of compartments and ducts for transporting the oil to and from, and between cooling tubes 159 and 160. The duct 152 communicates at its discharge end with a duct 161 leading into the outer compartment of the filter 156. The inner compartment of the filter, which is separated from the outer compartment by a conventional filtering element, communicates through a duct 162 with a compartment 163 communicating with the lower end of the cooling tubes 159. The upper ends of the cooling tubes 159 open into a chamber 164 which communicates at its forward end with the upper ends of the cooling tubes 160. (See Figure 18 which illustrates the interior construction of the casting containing the chambers 163 and 164.) The lower ends of the cooling tubes 160 lead into a chamber 165 formed in the previously mentioned casting which communicates through a conduit 166 with the supply reservoir 91.

Mounted within the casting containing the chambers 163, 164, and 165, there is a spring pressed valve 167 which controls a passage between the conduit 162 and a duct 168 leading from the duct 161, and which is designed to permit oil to pass directly from the duct 161 into the conduit 162, and from there into the chamber 163 should the filtering element become clogged. Mounted at the forward end of the chamber 163 is a second spring pressed valve 169 which controls a passage between such chamber and the chamber 165. This valve is adapted to open and allow oil from the chamber 163 to flow directly into the chamber 165 in case the oil cooling tubes 159 and 160 become obstructed.

The lubricating system is designed to hold an amount of oil when full equal to the capacity of the reservoirs 91 and 147 and the cleaning and cooling system h. It is so constructed, as will be hereinafter explained, that substantially all of the oil in the system is contained within the reservoir 91 and the system h when the engine is running.

During operation of the engine, the pump 128 draws oil from the supply reservoir 91 through the conduits 144 and 143 delivering it through the manifold 145 and the ducts 146 to the bearings of the engine. The oil discharged through the bearings of the engine collects in the reservoir 147 in the bottom of the casting 80, from whence it is drawn into the inlet chambers 134 and 135 of the pump 129 through the conduit 139, and the conduits 149 and 148. From the inlet chambers 134 and 135, the oil is delivered into the pressure chambers 136 and 137, from where it is forced through the ducts 140 and 141 into the duct 142, and through ducts 150, 151, 152 and 161 into the outer compartment of the cleaner 156. The oil delivered into the outer compartment of the cleaner 156 passes into the inner compartment, and is delivered from there into the chamber 163 by way of the duct 162. From the chamber 163 the oil passes through the cooling tubes 159, the chamber 164, and the cooling tubes 160 into the chamber 165, and from the chamber 165 through the conduit 166 into the supply reservoir 91.

The capacity of the pump 129 is such that either side of the pump acting alone is capable of drawing a much greater volume of oil from the reservoir 147 than is delivered thereto by the pump 128. As a result, any oil contained in the reservoir 147 at starting of the engine is quickly pumped into the upper reservoir 91, and the reservoir 147 thereafter maintained substantially dry of oil, notwithstanding inclination of the engine resulting in a drainage of the oil to one end of such reservoir. Due to the pump 129 being constructed with a capacity as described, a certain amount of air is drawn from the receiving reservoir 147 and delivered into the supply reservoir 91 by the action of such pump during operation of the engine. Means for returning the air delivered into the reservoir 91 to the reservoir 147 is provided in the form of a conduit 170 leading from the upper portion of the reservoir 91 to the interior of the casting 80.

The cooling water for the chamber 157 (see Figures 2, 3, 6, 15 and 16) is delivered thereto from the radiator 62 by means of the pump 104, the connection between the pump and the radiator comprising a hose section 171 connecting the outlet pipe 172 of the radiator with a tubular projection 173 formed on the left hand forward T-connection 51 of the sub-frame, the left hand side member 49 of the sub-frame, and a hose section 174 connecting a pipe 175 communicating with the interior of the member 49 with the intake pipe 176 of the pump. The connection between the pump 104 and the chamber 157 comprises a pipe 177 leading into the chamber and a hose section 178 connecting the pipe 177 with the outlet pipe 179 of the pump. From the chamber 157 the water passes through conduits 180 into cooling water passages formed in the engine, and from the cooling water passages in the engine into manifolds 181 mounted on the side of the engine. From the manifolds 181, the water is delivered back to the radiator through pipes 182 connected to the manifolds by hose connections 183 and to the intake pipes 184 of the radiator by hose connections 185.

Returning at this point to the reservoir 147 in the bottom of the crankcase, such reservoir is constructed with a capacity such that it can hold all of the oil employed in the engine without flooding the combustion chambers or cylinders, the height of the oil attaining a level slightly below the valves. One object of providing the reservoir 147 with the capacity described is to permit the engine to be filled with oil when not running without danger of flooding the combustion chambers and cylinders. A further object is to avoid flooding the combustion chambers and cylinders with oil in consequence of the engine having stood idle for a sufficient time for the oil in the upper portion of the engine to have drained into the reservoir 147 through the pumps 128 and 129. During running of the engine, flooding of the combustion chambers and cylinders is prevented by the action of the pump 129 which maintains the reservoir 147 substantially empty of oil.

The reservoir 91 is constructed with a shallow forward portion which lies under the floor boards of the cab and with a deep rear portion embodying the aforementioned portion 91a which extends upward under the seat of the cab. By constructing the reservoir 91 in such manner, a reservoir of adequate capacity is obtained without increasing the height of the floor above that required for other purposes. The top wall of the reservoir is formed with a filling neck 186 provided with a closing cap 187, and mounted in an aperture in the top wall of the reservoir adjacent the filling neck there is a measuring rod 188 equipped with a handle 189.

Preparatory to the accurate determination of the amount of oil in the lubricating system, the vehicle is placed in a level position, the engine operated for a sufficient length of time for the pump 129 to return to the reservoir 91 any oil which may have drained into the reservoir 147, and the engine set in advance of measurement by the rod 188 to run at a low speed at which the air passing through the reservoir 91 will not greatly agitate the oil in such reservoir or build up large pressure surges. If the rod 188 is then withdrawn, wiped off, reinserted and withdrawn after the fashion employed in measuring oil in a conventional automobile engine, the oil mark on the rod 188 will show with a fair amount of accuracy the amount of oil in the lubricating system. The replenishment of the oil used up in the operation of the engine is accomplished by introducing oil into the crankcase by way of the filling neck 186, and is preferably done while the engine is running so that the oil can be measured from time to time.

The lubricating system is drained of oil by removing a pair of plugs 190 and 191 in the bottom of the casting 80 and the plug 153 at the lower end of the duct 143. To fill the lubricating system after it has been drained of oil, the amount of oil required to fill the lubricating system is poured into the filling neck 186 while the engine is idle.

The transmission c is constructed with a small depth or vertical extension and is secured to the engine b to form a unit therewith in a conventional manner. Such transmission is constructed with large heavy gears in order to transmit the large amount of power delivered thereto by the engine b, and in order to reduce its vertical extension or depth is constructed with a shifting mechanism located at one side thereof. In vehicles employing an engine having less power it will of course not be necessary to construct the transmission with a shifting mechanism arranged at one side and it is to be understood that by a transmission constructed with a small vertical extension or depth is meant that the transmission does not have a sufficient depth to decrease the road clearance beyond a practical distance.

Generally described, the transmission c comprises (see Figures 24, 25 and 26) a driving shaft 192 connected to the driven mechanism of the engine clutch, a driven shaft 193 in axial alignment with the driving shaft 192, and a countershaft 194 located below the driven shaft 193.

Figure 24:
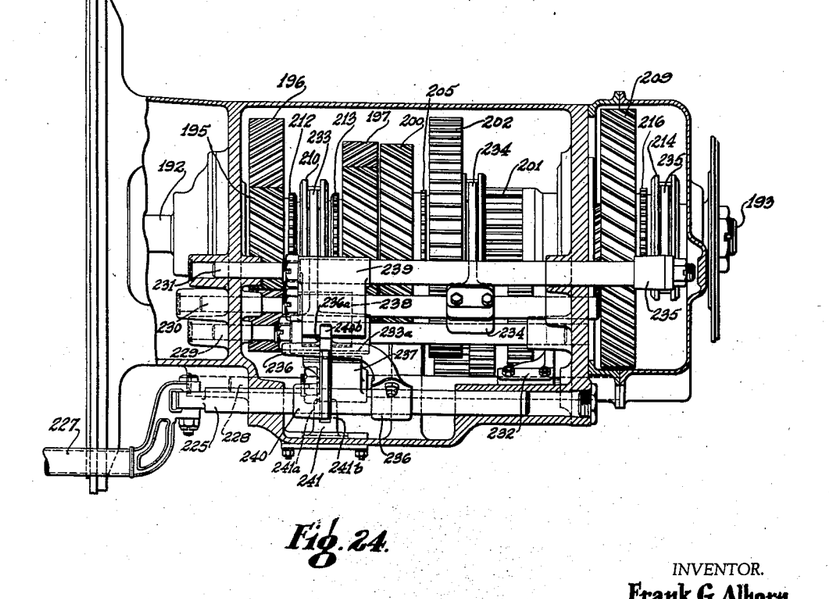
Figure 24 is a plan view of the transmission with the upper part of the housing cut away to show the internal mechanism.
Figure 25:
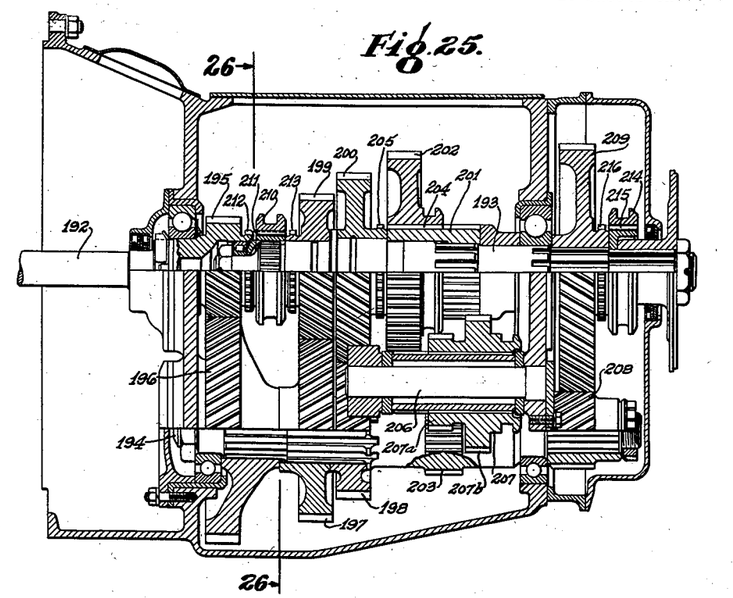
Figure 25 is a side elevational view of the transmission with the near portion of the housing cut away, certain parts being shown in section and partial section, and others being omitted, all in the interest of showing internal construction.
Figure 26:
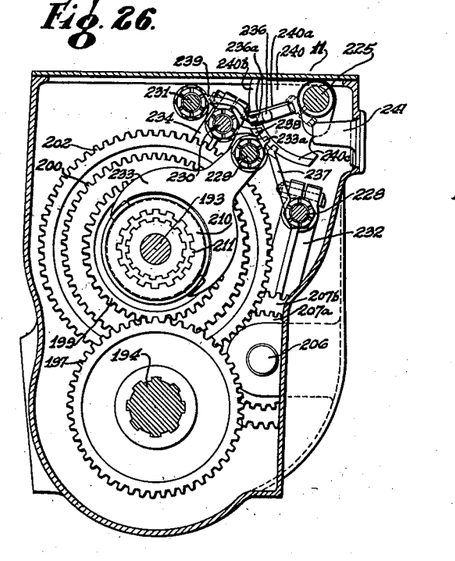
Figure 26 is a sectional view of the transmission taken on a line corresponding with line 26—26 of Figure 25.

Formed on the rear end of the driving shaft 192, there is a driving gear 195 which meshes with a driven gear 196 rigidly secured upon the forward end of the countershaft 194. Rigidly mounted on the forward end of the countershaft adjacent the gear 196, there are two gears 197 and 198 which mesh with gears 199 and 200 rotatably mounted upon the driven shaft 193. Splined on a sleeve 201 fixed on the driven shaft 193, there is a gear 202 arranged to occupy a neutral position as shown, a rearward position in which it meshes with a gear 203 formed on the counter shaft 194, and a forward position with its internally splined teeth 204 in engagement with teeth 205 on the gear 200. Slidably and rotatably mounted upon a shaft 206 located at one side of the countershaft 194, there is an integrally formed gear set 207 consisting of two gears 207a and 207b which can be moved from the position shown in the drawings to a position in which the gears 207a and 207b are brought into engagement with the gears 202 and 203 on the driven shaft and countershaft. Rigidly mounted upon the rear end of the countershaft 194, there is a gear 208 which meshes with a gear 209 fixed on the rear end of the driven shaft 193.

Slidably and non-rotatably mounted upon the forward end of the driven shaft 193, there is an internally splined clutch member 210, the splined teeth 211 of which are designed for engagement with teeth 212 formed on the gear 195, and with teeth 213 formed on the gear 199. Similarly mounted upon the rear end of the driven shaft 193, there is a second clutch member 214 the internally splined teeth 215 of which are designed for engagement with teeth 216 formed on the gear 209.

Assuming that in each instance the clutch members 210 and 214 and the gear 202 initially occupy the positions shown, five forward speeds and a single reverse speed are obtained as follows:

First speed, by shifting the clutch member 214 in a forward direction to bring its splined teeth 215 into engagement with the teeth 216 on the gear 209, the resulting drive being through gears 195, 196, 208 and 209.

Second speed, by shifting the gear 202 in a rearward direction to bring it into a position with its teeth in mesh with the teeth of the gear 203, the resulting drive being through gears 195, 196, 203 and 202.

Third speed, by shifting the gear 202 in a forward direction to bring its internal splined teeth 204 into engagement with the teeth 205 on the gear 200, the resulting drive being through gears 195, 196, 198 and 200.

Fourth speed, by shifting the clutch member 210 in a rearward direction to bring its splined teeth 211 into engagement with the teeth 213 on the gear 199, the resulting drive being through gears 195, 196, 197 and 199.

Fifth speed or direct drive, by shifting the clutch member 210 in a forward direction to bring its splined teeth 211 into engagement with the teeth 212 on the gear 195, and Reverse, by shifting the gear set 207 in a forward direction to bring the gears 207a and 207b thereof into engagement with the gears 202 and 203, the resulting drive being through gears 195, 196, 203, 207b, 207a and 202.

Figure 27:
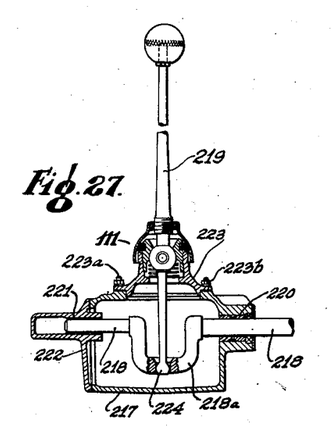
Figure 27 is a sectional view of a shifting mechanism for the transmission.

The mechanism for shifting the clutches 210 and 214, the gear 202 and the gear set 207 comprises a mechanism m (see Figures 2 and 27) mounted at the forward end of the vehicle and a mechanism n mounted within the transmission casing. Generally described, the mechanism m comprises a casing 217, a shaft 218, and a shifting lever 219. The shaft 218 is formed with a crank portion 218a, and is slidably mounted in a rear bearing 220 supported in the rear wall of the casing and in a front bearing 221 mounted in a plate 222 secured to the forward end of the casing. The shifting lever 219 is mounted for universal movement in a cover plate 223 secured to the top of the casing, and is formed at its lower end with a ball 224 which is engaged in a slot in the lower portion of the crank 218a. Through this arrangement the lever 219 when moved longitudinally with respect to the vehicle causes the shaft 218 to be shifted in a reverse direction, and when moved transversely with respect to the vehicle causes the shaft 218 to be rotated in a corresponding direction. The cover plate 223 is secured to the top of the casing 217 by two stud-bolts 223a, in such a manner that the plate and the lever 219 can be readily removed by unscrewing the nuts 223b on the upper ends of the stud-bolts.

The mechanism n comprises a shaft 225 mounted for longitudinal movement and rotatable oscillation within the left hand side of the transmission casing. This shaft is connected with the shaft 218 of the mechanism m by means of two shafts 226 and 227, and is designed to co-act with four shifter rods 228, 229, 230 and 231 mounted in the transverse walls of the transmission housing and respectively connected by forks 232, 233, 234 and 235 to the gear set 207, the clutch 210, the gear 202, and the clutch 214. Secured upon the shaft 25 is a finger 236 formed with a projection 236a designed for engagement between the bifurcated outer ends of parts 237, 238 and 239 mounted respectively on the forward ends of the rods 228, 230 and 231, and between the spaced portion of a bifurcated lug 233a formed on the fork 233.

Rotatably mounted upon the shaft 225 there is a plate 240 formed with a slot 240a which receives the finger 236, and with flanged portions 240b and 240c designed for engagement between the bifurcated ends of the members 237, 238 and 239 and the lug 233a on the fork 233. This plate is held against longitudinal movement by means of a member 241 secured to the side wall of the transmission casing and formed with fingers 241a and 241b which straddle such member. In actuation of the shifting mechanism the plate 240 turns with the finger 236 and through the instrumentality of the flanged portions 240b and 240c acts to lock the shifter rods in neutral position except when operatively connected to the finger 236.

In effecting a speed change the shafts 218, 226, 227 and 225 are rotated through transverse movement of the lever 219, moving the finger 236 out of engagement with the bifurcated end of one of the members 237, 238, 239 or the lug 233a on the fork 233 into engagement with the end of another of such members. The lever 219 is then moved forward or rearwardly to effect the speed change desired with a resultant longitudinal movement of the rods 218, 226, 227 and 225 and the finger 236 producing a longitudinal movement of the shifter rod connected to the finger and shifting the associated parts of the transmission. In accomplishing such operation, the plate 240 is turned by the finger 236 to a position where one or the other of the flanged portions 240b and 240c or both of such portions, depending upon the driving connection initiated, acts to lock into neutral positions the shifter rods retained in such positions.

The cab A is mounted over the engine at the forward end of the chassis frame, and is constructed with a flooring superadjacent the engine. It is supported in place upon the chassis frame (see Figures 2, 6, 7, 8, 14, 28 and 29) by a three point mounting comprising two brackets 242 secured to the forward end of the side rail 10 and a member 243 in the form of an inverted U secured at its end to the spring brackets 22. The forward portion of the cab is supported from the brackets 242 by means of flanged members 244 secured to members 245 of the frame work of the cab, and the rear portion of the cab is supported from the member 243 by means of a channel member 246 constituting a part of the frame work in the rear of the cab. The members 244 rest on rubber members 247 reinforced with metal shells 248 inserted between such members and the brackets 242, and are secured in place by bolts 249 extending through the rubber members 247. The channel member 246 is secured to the member 243 by bolts 250 with a strip of anti-squeak material 251 inserted between the two members.

Figure 28:
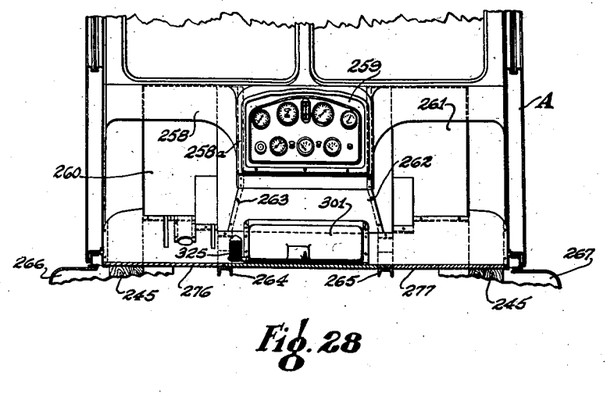
Figure 28 is a fragmentary sectional view of the truck taken through the forward end of the cab and looking toward the forward end thereof.
Figure 29:
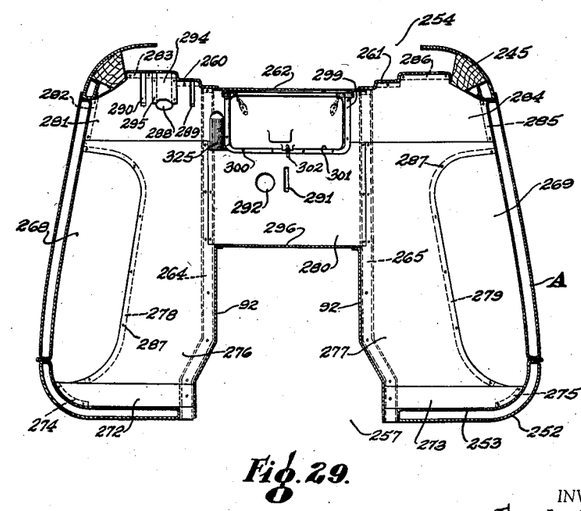
Figure 29 is a sectional plan view of the cab with the radiator grille removed, the section being taken through the lower portion of the cab.

The cab A is constructed with an outer shell 252 and an inner shell 253 secured together and reinforced by suitable bracing members. The inner shell 253 is terminated at the forward ends and side of the cab at the floor level and at the rear of the cab at its intersection with the member 246. At the forward end of the cab, the outer shell 252 is formed with an opening 254 having the general shape of the radiator 62 and of such size that the radiator can pass therethrough when it is removed with the power plant G in the manner hereafter explained, the opening being covered by a removable grille 255 held in place by bolts 256. At the rear end of the cab, the outer shell is formed with a rectangular opening 257 which extends upward to the member 246 and has a greater width than the transmission and rear portion of the engine. The outer and inner shells 252 and 253 at the forward end of the cab are spaced apart a relatively large distance in order to provide room for the upper portion of the radiator 62. The inner shell at the forward end of the cab comprises a member 258 formed with a dash 258a supporting a removable instrument panel 259, two members 260 and 261 located at the sides of the cab in the rear of the radiator and joining with the dash 258a and a removable member 262 held in place by screws 263 and closing the opening between the members 260 and 261, the construction being such that the opening between the members 260 and 261 affords a free passageway for the upper portion of the engine when the power plant is removed from the vehicle in the manner previously referred to.

The lower portion of the cab comprises two longitudinally extending floor supporting members 264 and 265 secured at their forward ends to the members 260 and 261 and at their rear ends to the outer shell 252, the housing 92 previously referred to, two fenders 266 and 267 secured to the frame work in the sides of the cab, and two wheel housings 268 and 269 secured at their upper ends to the frame work in the sides of the cab and extending downward adjacent the sides of the engine. The wheel housings 268 and 269 (see Figure 6) are connected at their lower ends through flexible members 270 with plates 271 secured to the sides of the chassis frame and form in conjunction with the plates 271 housings for the sides of the engine.

The flooring for the cab comprises two rear members 272 and 273 supported by the longitudinal members 264 and 265 and plates 274 and 275 secured to the inner shell of the cab, two floor boards 276 and 277 supported by the longitudinal members 264 and 265 and flanges 278 and 279 secured to the wheel housings 268 and 269, a floor board 280 located in front of the housing 92 and supported by the longitudinal members 264 and 265, a toe board 281 at the left hand side of the cab supported by the member 264 and by flanges 282 and 283 on the inner shell of the cab and on the member 260, and a toe board 284 at the right hand side of the cab supported by the member 265 and by flanges 285 and 286 on the inner shell of the cab and on the member 261.

The floor boards 272, 273, 276, 277 and 280, and the toe boards 281 and 284, are detachably secured in place by screws 287, and are so constructed and coordinated as to be readily removable. The left hand toe board 281 is formed with slots 288, 289 and 290 for the steering post, the brake pedal 39, and the clutch pedal 40 which extend to the upper edge of such part and permit its removal without interference by the steering post and the pedals 39 and 40; and the floor board 280 is provided with a slot 291 and an aperture 292 which permits its removal without disconnecting the shift lever 219 or a brake lever 293 which extends through such part. A cover plate 294 for the upper end of the slot 288 for the steering post is removably mounted in place by screws 295. The purpose of constructing and mounting the floor boards for ready removal is to provide easy access to the engine and to provide for ready removal of the power plant from the vehicle.

The floor board 280 supports a door 296 for the forward end of the structure 92 pivotally mounted at the rear end of such floor board and held in closed position by a wing nut 297 mounted on a threaded member 298 pivotally attached to the upper part of the casing 92 and extending through an aperture in the door. The toe boards 281 and 284 in conjunction with the floor board 280 and the member 262 support a removable casing 299 secured in place by screws 300, which casing extends over the opening between the toe boards, and overlies the fan 107. The casing 299 is provided with a door 301 superadjacent the fan 107 pivoted to the upper end of the casing and held in closed position by a wing nut 302 mounted on a threaded member 303 screwed into the end wall of the casing and extending through the door. The door 296 prevents fumes from the engine from entering the cab by way of the casing 92 and permits ready access to the carburetors 97, the measuring rod 188, and the filling neck 187. The door 301 provides for ready adjustment of the idler pulley 114 and replacement of the belts 113 and 115 without removal of the toe boards, and serves to exclude fumes from the engine from entering the cab. Apertures 304 formed in the wheel housings 268 and 269 and closed by detachable covers 305 held in place by screws 306 provide entrances through which the distributors 307 of the engine can be reached without removal of the floor boards or the wheel housings.

The cab is provided with a seat P (see Figures 3, 6 and 14) divided into two sections P1 and P2 each comprising a back portion 308, and a seat portion 309 hinged to the back portion. The back portion 308 of each section is equipped with four rollers 310 supported from the back portion by means of brackets 311 and arranged to fit in tracks 312 secured to the back of the cab. The sections P1 and P2 normally occupy positions with the seat portions 309 resting on the housing 92 and members 313 secured to the sides of the cab, with pins 314 mounted on the housing 92 and the members 313 extending into apertures in the seat portion to hold such portions in position. When desired, the seat sections P1 and P2 may be moved into the position illustrated in Figure 14 wherein the upper rollers 310 drop into notches 315 in the tracks 312 to maintain the sections in suspended positions. To move one of the seat sections to the position illustrated in Figure 14, the forward end of the seat portion 309 is lifted to a height to cause withdrawal of the pins 314 and the back portion pushed upward until the lower rollers 310 engage stops 316 set in the tracks and the upper rollers 310 fall into the notches 315 to hold the section in suspended position.

To return one of the seat sections to its normal position after being suspended as described, the upper end of the back portion is pushed rearwardly to remove the upper rollers 310 from the notches 315, the seat portion rotated in a forward direction, and the section lowered with the seat portion held in a position in which the pins 314 will enter the apertures in such portion.

By constructing and mounting the seat portion in the manner described, ready removal of the floor boards is obtained and easy access to the underlying portion of the power plant provided.

The truck is provided with brakes at the wheels operated by a compressed air system of a conventional type. The compressed air system comprises a storage tank 317 secured to the right hand side rail of the chassis frame and receiving air from the compressor 106, and a control valve 318 mounted on the member 243. The control valve 318 is operated by the pedal 39 which is connected with the operating lever of the valve 318 by means of a pull rod 319. The truck is also provided with a propeller shaft brake 320 of the disc type located at the rear of the transmission which brake is connected by a linkage S with the hand lever 293.

The engine clutch is operated by compressed air taken from the storage tank 317, the operating mechanism consisting of a cylinder plunger mechanism 321 pivotally mounted on the transmission casing and connected to the operating lever 322 of the clutch, and a valve 323 supported on a bracket 324 attached to the steering column assembly d and operated by the pedal 40. The throttle valves 97a of the carburetors 97 are controlled through a suitable arrangement of mechanism including an accelerator pedal 325 pivotally mounted on the casing 299, and a linkage t connecting the pedal 325 with the operating arms of the throttle valves 97a.

The power plant G and the radiator 62 form with the sub-frame e a unit which can be readily removed from the vehicle. To accomplish removal of such unit the accelerator pedal 325 is disconnected from the linkage t and the casing 299 removed, the plate 294 detached and the toe board 281 removed, the toe board 284 removed, the floor board 280 and the door 296 supported thereby removed, the plate 262 removed, the wiring and other connections leading to the instrument panel 259 from outside the unit disconnected, all connections leading to the instrument panel from the unit and interfering with its displacement onto the engine removed, the instrument panel 259 detached from the dash 253a and laid on the forward end of the engine, the shifting lever 219 and the cover plate 223 removed, the brake lever 293 disconnected from the linkage S and laid over against the radiator, the radiator grille 255 removed, the propeller shaft 30 disconnected from the driven shaft 193 of the transmission, the drag link 37 disconnected from the steering post assembly d, the rod 319 disconnected from the brake pedal 39, the air connection between the valve 323 and the reservoir 317 disconnected, the air connection between the valve 323 and the mechanism 321 disconnected, the steering post assembly disconnected from the chassis frame and either suspended in an elevated position as shown in Figure 14 or removed from the cab, and the exhaust pipes 102 disconnected from the manifolds 101 of the engine at the joints 326. Following the removal and disconnection of the parts enumerated, the bolts 79 securing the mechanism f to the pad 72 on the cross member 15 are removed, and the nuts 70a on the studs 70 turned outward to loosen the gripping action of the caps 69. The unit is then ready for removal from the vehicle.

The removal of the unit is best accomplished through the use of a dolly u as shown in Figures 13 and 14. The dolly is moved in front of the radiator with the tracks 327 and 328 of the dolly in alignment with the side members 10 of the chassis frame B, and the unit drawn forward with the rubber members 59 sliding on the tracks of the dolly. Following initial forward movement of the unit, the wheels 60 are lowered into engagement with the flanges of the members 61 through engagement of the bevelled ends 49a and 50a of the members 49 and 50 with the parts 68 and 69 rendering withdrawal more easy. When the unit has been moved forward to a point at which the wheels 60 are brought onto the tracks of the dolly, the dolly is rolled forward completing removal of the engine.

Replacement of the unit within the vehicle is accomplished by reversing the process just described, the wheels 60 on the sub-frame being lifted during insertion of the engine by the camming action initiated through engagement of the bevelled portions 49a and 50a of the members 49 and 50 with parts 68 and 69.

The operation of the truck is similar to that of a conventional automobile and will be readily understood by those skilled in the art to which this invention pertains.

What I claim is:

1. The combination in an automotive vehicle of front and rear axles, wheels on said axles, a chassis frame supported upon said axles constructed with a dropped portion extending over the front axle, an engine of small vertical extension constructed with horizontal cylinders supported by the aforesaid dropped portion of said frame in a position above and closely adjacent to said dropped portion, and a cab supported upon the forward portion of said frame extending above said engine and equipped with a flooring located above and in closely spaced relation to said engine.

2. The combination in an automotive vehicle, of a front axle constructed with a dropped central portion, a rear axle, wheels on said axles, a chassis frame supported upon said axles constructed with a dropped portion extending over the dropped portion of said front axle, an engine of small vertical extension constructed with horizontal cylinders supported by the aforesaid dropped portion of said frame in a position above and closely adjacent to said dropped portion, and a cab supported upon the forward end of said frame extending above said engine and equipped with flooring located above and in closely spaced relation to said engine.

3. The combination in an automotive vehicle, of a front axle constructed with a dropped central portion, a rear axle, wheels on said axles, a chassis frame supported upon said axles by means of front and rear springs, said chassis frame being constructed with a dropped portion at its forward end which extends over the dropped portion of said front axle, and the aforesaid front springs being located at the outer sides of the dropped portion of said chassis frame, an engine constructed with horizontal cylinders and having a forward portion of small vertical extension supported by the aforesaid dropped portion of said frame in a position above and closely adjacent said dropped portion, and a cab supported upon the forward portion of said frame comprising a flooring located above and in closely spaced relation to said engine.

4. The combination in an automotive vehicle, of front and rear axles, wheels on said axles, a chassis frame supported upon said axles constructed with a dropped portion at its forward end, a cab supported upon the forward portion of said frame constructed with a flooring located in spaced relation to the aforesaid dropped portion of said frame and with a seat located at the rear of said flooring and extending above said flooring, a dry sump engine constructed with horizontal cylinders mounted upon the aforesaid dropped portion of said frame in a position within the lower portion of said cab, said engine comprising a forward portion of small vertical extension which extends beneath the aforesaid flooring, and a lubricant reservoir which extends upward above the aforesaid flooring beneath the aforesaid seat.

5. The combination in an automotive vehicle, of front and rear axles, wheels on said axles, a chassis frame supported upon said axles and constructed with a dropped portion at its forward end, a cab supported upon the forward portion of said frame comprising a flooring located in spaced relation to the aforesaid dropped portion of said frame, a casing having an open bottom located at the rear of said flooring and extending above said flooring, and a seat located above and supported by said casing, said casing being closed at its forward end by a pivotally mounted door, a dry sump engine constructed with horizontal cylinders mounted upon the aforesaid dropped portion of said frame in a position within the lower portion of said cab, said engine comprising a forward portion of small vertical extension which extends beneath the aforesaid flooring and a lubricant reservoir which extends upward above the aforesaid flooring within said casing, said lubricant reservoir comprising a filler neck located adjacent the forward portion of said reservoir in a position to be accessible by opening the aforesaid door.

6. The combination in an automotive vehicle, of front and rear axles, wheels on said axles, a chassis frame supported upon said axles and constructed with a dropped portion at its forward end, a cab supported upon the forward portion of said frame comprising a flooring located in spaced relation to the aforesaid dropped portion of said frame, a casing of less width than said cab and open at its bottom located at the rear of said flooring and extending above said flooring, and a seat construction located above and supported by said casing, said flooring comprising removable members located at the sides of said casing and extending from the rear of said cab to the forward portion of said cab, and a dry sump engine constructed with horizontal cylinders mounted upon the aforesaid dropped portion of said frame in a position within the lower portion of said cab, said engine comprising a lubricant reservoir which extends upward above said flooring within said casing and being constructed with removable cylinder heads which underlie the aforesaid removable floor members.

7. The combination in an automotive vehicle, of front and rear axles, wheels on said axles, a chassis frame supported upon said axles and constructed with a dropped portion at its forward end, a cab supported upon the forward portion of said frame comprising a flooring located in spaced relation to the aforesaid dropped portion of said frame, a casing of less width than said cab and open at its bottom located at the rear of said flooring and extending above said flooring, and a seat construction located above said casing and extending substantially across said cab, said flooring comprising removable members located at the sides of said casing and extending from the rear of said cab to the forward portion of said cab, and said seat construction being mounted for movement to a position permitting ready access from within said cab to mechanism located below said removable members, and a dry sump engine constructed with horizontal cylinders mounted upon the aforesaid dropped portion of said frame in a position within the lower portion of said cab below said flooring, said engine comprising a lubricant reservoir which extends upward above said flooring within said casing and being constructed with spark plugs underlying the aforesaid removable members.

8. The combination in an automotive vehicle, of front and rear axles, wheels on said axles, a chassis frame supported upon said axles and constructed with a dropped portion at its forward end, a cab supported upon the forward portion of said frame constructed with a flooring located in spaced relation to the aforesaid dropped portion of said frame and with a seat located above said flooring at the rear end thereof, and a dry sump engine constructed with horizontal cylinders mounted upon the aforesaid dropped portion of said frame in a position within the lower portion of said cab, said engine comprising a forward portion of small depth which extends beneath the aforesaid flooring, and being constructed with a lubricant reservoir and an intake apparatus which extends upward above the aforesaid flooring beneath the aforesaid seat.

9. The combination in an automotive vehicle, of a front axle constructed with a dropped central portion, a rear axle, wheels on said axles, a chassis frame supported upon said axles constructed with a dropped portion extending over said front axle, an engine of small vertical extension constructed with horizontal cylinders supported by the aforesaid dropped portion of said frame in a position above and closely adjacent to said dropped portion, a cab supported upon the forward portion of said frame extending above said engine and equipped with flooring located above and in closely spaced relation to said engine, and dust and water impervious means extending from the sides of said cab to the sides of said chassis frame arranged to protect the sides of said engine from water and dust thrown up by the wheels mounted on said front axle.

10. The combination in an automotive vehicle of front and rear axles, wheels on said axles, a chassis frame supported upon said axles and constructed with a dropped portion extending over said front axle, an engine of small vertical extension constructed with horizontal cylinders supported by the aforesaid dropped portion of said frame in a position above and closely adjacent to said dropped portion, a belt driven mechanism mounted on the upper portion of said engine, a cab supported upon the forward portion of said frame extending above said engine and equipped with a flooring located above and in closely spaced relation to said engine, said flooring being formed with an aperture superadjacent said mechanism and supporting a door for closing said aperture.

11. The combination in an automotive vehicle, of a front axle constructed with a drop central portion, a rear axle, a chassis frame supported upon said axles constructed with a vertically offset forward portion, an engine of small vertical extension constructed with horizontal cylinders and supported by said offset portion of said frame in close relation thereto with the crank shaft of said engine extending longitudinally of the vehicle, and a cab mounted upon said offset portion of said frame and constructed with a flooring located above said engine.

12. The combination in an automotive vehicle, of a front axle constructed with a drop central portion, a rear axle, a chassis frame supported upon said axles constructed with a vertically offset forward portion, an engine of small vertical extension constructed with horizontal cylinders and supported by said offset portion of said frame in close relation thereto with the crank shaft of said engine extending longitudinally of the vehicle, said engine being constructed with a dry sump lubricating system in order to decrease its vertical extension, and a body mounted upon said frame and constructed with a flooring located above said engine.

FRANK G. ALBORN.